(12) United States Patent
Xu et al.

(10) Patent No.: US 6,519,022 B1
(45) Date of Patent: Feb. 11, 2003

(54) OPTICAL ROUTING SWITCH USING SYMMETRIC LIQUID CRYSTAL CELLS

(75) Inventors: Ming Xu, Dallas, TX (US); Chongchang Mao, Plano, TX (US); Kuang-Yi Wu, Plano, TX (US); Jian-Yu Liu, Garland, TX (US)

(73) Assignee: Chorum Technologies LP, Richardson, TX (US)

( * ) Notice: Subject to any disclaimer, the term of this patent is extended or adjusted under 35 U.S.C. 154(b) by 251 days.

(21) Appl. No.: 09/621,634

(22) Filed: Jul. 21, 2000

Related U.S. Application Data

(63) Continuation-in-part of application No. 09/546,645, filed on Apr. 10, 2000, which is a continuation of application No. 09/063,611, filed on Apr. 21, 1998, now Pat. No. 6,049,404, which is a continuation-in-part of application No. 08/979,525, filed on Nov. 26, 1997, now Pat. No. 5,946,116.
(60) Provisional application No. 60/042,575, filed on Apr. 2, 1997.

(51) Int. Cl.$^7$ .................................................. G02F 1/13
(52) U.S. Cl. ...................... 349/196; 359/117; 359/122; 359/127; 359/128; 359/139; 359/156
(58) Field of Search ......................... 349/196; 359/122, 359/117, 128, 127, 139, 156, 483, 494, 495, 496

(56) References Cited

U.S. PATENT DOCUMENTS

| | | |
|---|---|---|
| 4,919,522 A | 4/1990 | Nelson |
| 5,136,671 A | 8/1992 | Dragone |

(List continued on next page.)

FOREIGN PATENT DOCUMENTS

| | | | |
|---|---|---|---|
| WO | WO 98/47040 | 10/1998 | |
| WO | WO 98/47254 | 10/1998 | ............ H04J/14/02 |
| WO | WO 99/55024 | 10/1999 | ............ H04B/10/00 |

OTHER PUBLICATIONS

E. O. Ammann, "Synthesis of Electro–Optic Shutters having a Prescribed Transmission vs Voltage Characteristis", Journal of the Optical Society of America, Aug. 1966, pp. 1081–1088, vol. 56–No. 8.

(List continued on next page.)

Primary Examiner—Kenneth Parker
Assistant Examiner—David Chung
(74) Attorney, Agent, or Firm—Baker Botts L.L.P.

(57) ABSTRACT

An optical routing switch uses two liquid crystal cells that can produce offsetting rotations of the polarization of the input beam to provide fast, symmetrical switching. The input beam is first polarized and then passes through both liquid crystal cells in series. Both liquid crystal cells have two states (e.g., voltage-off and voltage-on) in which the beam polarization is rotated by predetermined angles (e.g., 0° and 90°), but in opposing rotational directions. A controller selectively rotates the LC cells through a sequence of steps, beginning with a "through" state in which both LC cells are in the first state. The polarization rotations provided by both liquid crystal cells offset one another so the beam polarization remains essentially unchanged. The LC cells can be rapidly switched to a "cross" state in which only one of the LC cells is changed to the second state and the polarization of the beam is rotated by a predetermined degree. The LC cells can then be rapidly switched back to the through state by changing both LC cells to their second state. Once again, the LC cells offset one another so that the beam polarization remains essentially unchanged. While remaining in the through state, both LC cells are allowed to return to the first state to complete the cycle. Both LC cells relax at the same rate and their offsetting polarization rotations cause the beam polarization to remain unchanged throughout the entire relaxation process. A polarization-dependent routing element (e.g., a polarized beamsplitter or birefringent element) routes the beam exiting the LC cells along either of two alternative optical paths based on the beam's polarization.

26 Claims, 6 Drawing Sheets

U.S. PATENT DOCUMENTS

| | | | |
|---|---|---|---|
| 5,363,228 A | | 11/1994 | DeJule et al. |
| 5,381,250 A | | 1/1995 | Meadows |
| 5,414,540 A | * | 5/1995 | Patel et al. .................... 359/39 |
| 5,414,541 A | | 5/1995 | Patel et al. |
| 5,488,500 A | | 1/1996 | Glance |
| 5,596,661 A | | 1/1997 | Henry et al. |
| 5,606,439 A | | 2/1997 | Wu |
| 5,680,490 A | | 10/1997 | Cohen et al. |
| 5,694,233 A | * | 12/1997 | Wu et al. .................... 359/117 |
| 5,724,165 A | * | 3/1998 | Wu ............................. 359/117 |
| 5,771,120 A | * | 6/1998 | Bergmann ................. 359/484 |
| 5,809,190 A | | 9/1998 | Chen |
| 5,912,748 A | * | 6/1999 | Wu et al. .................... 359/117 |
| 5,946,116 A | * | 8/1999 | Wu et al. .................... 359/117 |
| 5,978,116 A | * | 11/1999 | Wu et al. .................... 359/124 |
| 6,005,697 A | * | 12/1999 | Wu et al. .................... 359/117 |
| 6,049,404 A | * | 4/2000 | Wu et al. .................... 359/117 |
| 6,097,518 A | * | 8/2000 | Wu et al. .................... 359/128 |
| 6,134,031 A | * | 10/2000 | Nishi et al. ................. 359/117 |
| 6,208,442 B1 | * | 3/2001 | Liu et al. .................... 359/127 |
| 6,285,478 B1 | * | 9/2001 | Liu et al. .................... 359/127 |

OTHER PUBLICATIONS

S.E. Harris et al., "Optical Network Synthesis Using Birefringent Crystals. * I. Synthesis of Lossless Networks of Equal–Length Crystals", Journal of the Optical Society of America, Oct. 1964, pp. 1267–1279, vol. 54–No. 10.

J.M. Senior et al., "Devices for wavelength multiplexing and demultiplexing", IEE Proceedings, Jun. 1989, pp. 183–202, vol. 136, pt. J, No. 3.

Kiyoshi Nosu et al., "Optical FDM Transmission Technique", Journal of Lightwave Technology, Sep. 1987, pp. 1301–1307, vol. LT–5, No. 9.

Kyo Inoue et al., "A Four–Channel Optical Waceguide Multi/Demultiplexer for 5–GHz Spaced Optical FDM Transmission", Journal of Lightwvve Technology, Feb. 1988, pp. 339–345. vol. 6. No. 2.

Youngchul Chung et al., "Analysis of a Tunable Mutichannel Two–Mode–Interference Wavelength Divsion Multiplexer/Demultiplexer", Journal of Lightwave Technology, May 1989, pp. 766–777, vol. 7. No. 5.

Jay N. Damask et al., "Wavelenght–Division Multiplexiong using Channel–Dropping Filters", Journal of Lightwave Technology, Mar. 1993, pp. 424–428, vol. 11, No. 3.

Benjamin B. Dingel et al., "Multifunction optical filter with a Michelson–Gires–Tournois interferometer for wavelength–division–multiplexed network system applications", Optical Letters, Jul. 15, 1998, pp. 1099–1101, vol. 23, No. 14, Optical Society of America.

* cited by examiner

OPTICAL ROUTING SWITCH USING SYMMETRIC LIQUID CRYSTAL CELLS

RELATED APPLICATIONS

The present application is a continuation-in-part of the Applicants' U.S. patent application Ser. No. 09/546,645, entitled "N×M Digitally Programmable Optical Routing Switch," filed on Apr. 10, 2000, which is a continuation of U.S. patent application Ser. No. 09/063,611, filed on Apr. 21, 1998, now U.S. Pat. No. 6,049,404, issued on Apr. 11, 2000, which is a continuation-in-part of U.S. patent application Ser. No. 08/979,525, entitled "1×N Digitally Programmable Optical Routing Switch," filed on Nov. 26, 1997, now U.S. Pat. No. 5,946,116, issued on Aug. 31, 1999, which is based on U.S. Provisional Patent Application No. 60/042,575, entitled "1×$2^N$ Digitally Programmable Optical Routing Switch," filed on Apr. 2, 1997.

BACKGROUND OF THE INVENTION

1. Field of the Invention.

The present invention relates generally to the field of routing switches for optical communications networks. More specifically, the present invention discloses an optical routing switch using symmetric liquid crystal cells to increase switching speed.

2. Statement of the Problem.

Optical routing switches are one of the key components in optical networks. The optical switch market has been growing rapidly to become a multi-billion business in recent years. They are to be used in systems such as network protection, signal add/drop, channel cross-connect, etc. Liquid crystal (LC) optical switching is a new technology that has much higher reliability than current mechanical switch technology. Liquid crystal switches having high reliability and excellent optical performance have been built. The response times of these switches, however, are not very fast.

When voltage is applied to a LC cell, the LC molecules are switched from a direction perpendicular to the electric field to a direction along the field (or from perpendicular to along the field, depending on the sign of the material's dielectric anisotropy). This is referred to as the "turn-on" process. The switching time can be expressed as:

$$\tau \propto \frac{\gamma d^2}{k_1(V^2/V_0^2 - 1)}$$

where $\gamma$ is a viscosity coefficient, $k_1$, is the elastic constant, $V$ is the applied voltage, $V_0$ is the threshold voltage of the material and $d$ is the thickness of the liquid crystal layer. $\gamma$, $k_1$, and $V_0$ are material constants. $d$ depends on the birefringence of the material. Once a LC material is chosen, we are left only being able to make the switching faster by apply a higher voltage $V$.

After the voltage is removed, the liquid crystal restores its original state. This relaxation process, however, is completely determined by the LC material constants. It is usually much slower than the turn-on process and thus limits the overall switching speed.

FIG. 1 depicts a conventional switching scheme in which the LC cell is switched back and forth in between the voltage-on and voltage-off states. In the voltage-off state, the polarization of the input beam is rotated 90° (i.e., the "cross" state). In the voltage-on state, the polarization doesn't change (i.e., the "through" state). At room temperature, the typical switching time from voltage-off to voltage-on state is approximately 1 ms and the typical relaxing time back is approximately 70 ms for typical telecommunications applications operating at infrared wavelengths (i.e., around 1550 nm).

To increase the relaxation speed, previous liquid crystal switches usually work at an elevated temperature (e.g., 50° C.) because the viscosity coefficient becomes smaller at higher temperatures. This technique helps to increase switching speed to a degree, but is still not very fast. However, this approach has the disadvantages of significantly increasing power consumption and possibly reducing the lifetime of the device.

3. Prior Art.

A scheme of fast liquid crystal operation for liquid crystal displays has been proposed by Thomas J. Haven, "A Liquid-Crystal Video Stereoscope With High Extinction Ratios, A 28% Transmission State, And One-Hundred-Microsecond Switching," *SPIE, True 3D Imaging Techniques And Display Technologies*, vol. 761, p. 23–26 (1987). In a liquid crystal display having a two-dimension array with a large number of pixels, Haven's approach requires two LC cells for each pixel, which doubles the cost and weight. This may be why Haven's scheme has been largely forgotten and has apparently never been commercialized. It should be noted that Haven's display employs each pair of LC cells only as a shutter mechanism or on/off switch for each pixel. Haven neither teaches nor suggests optical routing. In addition, Haven's approach is limited to pi-cells.

4. Solution to the Problem.

The present invention provides an optical routing switch that uses two liquid crystal cells to produce offsetting rotations of the polarization of the input optical beam to provide optical switching between a plurality of output ports that is both fast and symmetrical (i.e., has the same switching-on and switching-off speed). This approach successfully addresses the problem of asymmetrical switching speeds associated with conventional liquid crystal routing switches, as discussed above. The response time of the present optical switch is in the sub-millisecond range, compared to previous liquid crystal switches that have switching times in excess of 10 milliseconds at room temperature. In addition, the present invention consumes only a minimal amount of power because no heating or temperature control is needed. Compared to mechanical, acousto-optical, thermo-optical and crystal electro-optical switches, the present optical switch has the advantages of high reliability, high speed, low loss, and low cross-talk.

SUMMARY OF THE INVENTION

This invention provides an optical routing switch using two liquid crystal cells that can provide offsetting rotations of the polarization of the beam to provide fast, symmetrical switching. The input beam is first polarized and then passes through both liquid crystal cells in series. Both liquid crystal cells have two states (e.g., voltage-off and voltage-on) in which the beam polarization is rotated by predetermined angles (e.g., 0° and 90°), but in opposing rotational directions. A controller selectively rotates the liquid crystal cells through a sequence of steps, beginning with a "through" state in which both liquid crystal cells are in the first state. The polarization rotations provided by both liquid crystal cells offset one another so the beam polarization remains essentially unchanged. The liquid crystal cells can be rapidly switched to a "cross" state in which only one of the liquid crystal cells is changed to the second state and the polarization of the beam is rotated by a predetermined degree. The liquid crystal cells can then be rapidly switched back to the through state by changing both liquid crystal cells to their second state. Once again, the polarization rotations provided by both liquid crystal cells offset one another so the beam polarization remains essentially unchanged. While remaining in the through state, both liquid crystal cells are allowed to return to the first state to complete the cycle. Both liquid crystal cells relax at the same rate and their offsetting polarization rotations cause the beam polarization to remain unchanged throughout the entire relaxation process. A polarization-dependent routing element (e.g., a polarized beamsplitter or birefringent element) routes the beam exiting the liquid crystal cells along either of two alternative optical paths based on the beam's polarization.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which.

DETAILED DESCRIPTION OF THE INVENTION

Figure 2:
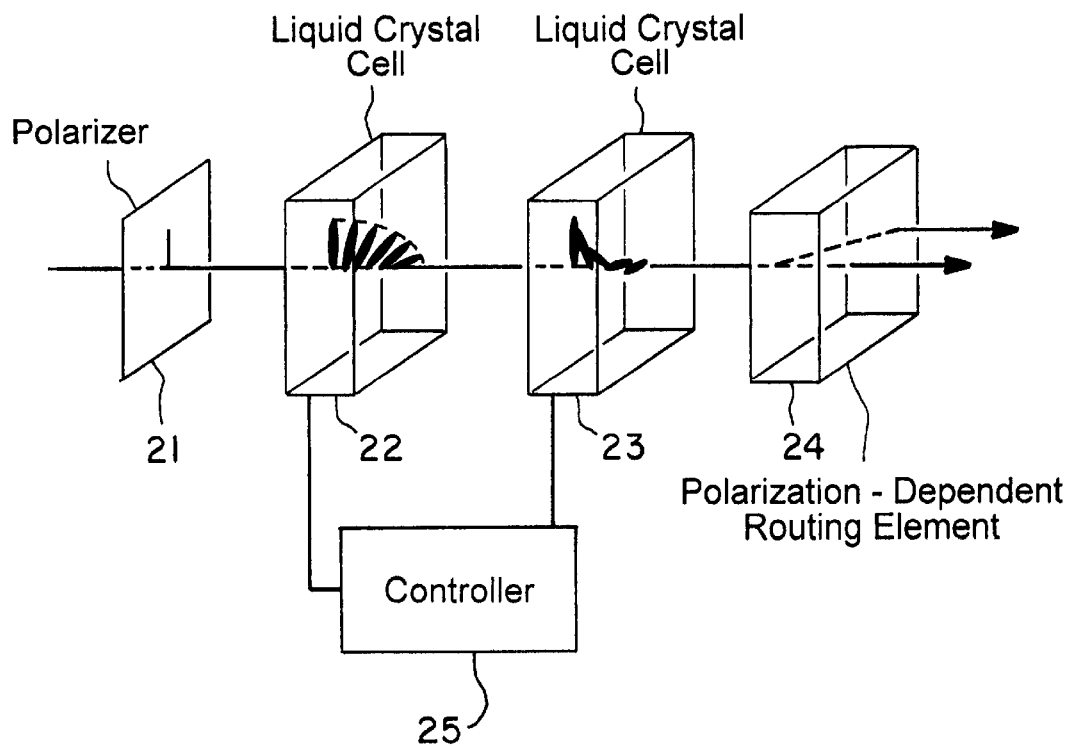
FIG. 2 is a schematic diagram of an optical routing switch implementing the present invention.

Turning to FIG. 2, a schematic diagram is provided of a 1×2 optical routing switch implementing the present invention. A polarizer 21 converts the input beam into a polarized beam, which then passes through two liquid crystal cells 22 and 23 in series. Each liquid crystal cell 22, 23 has two states in which the beam polarization is rotated by different angles (e.g., 90° and 0°) determined by an external control signal. The second LC cell 23 rotates the beam polarization in the same angles, but in the opposite direction from the first LC cell 22, so that the second LC cell 23 can offset or compensate for the polarization rotation caused by the first LC cell 22. For example, if the first LC cell 22 rotates the beam polarization by +90° in the first state and 0 degrees in the second state, the second LC cell 23 will rotate the beam polarization by −90 degrees in the first state and 0 degrees in the second state.

Figure 1:
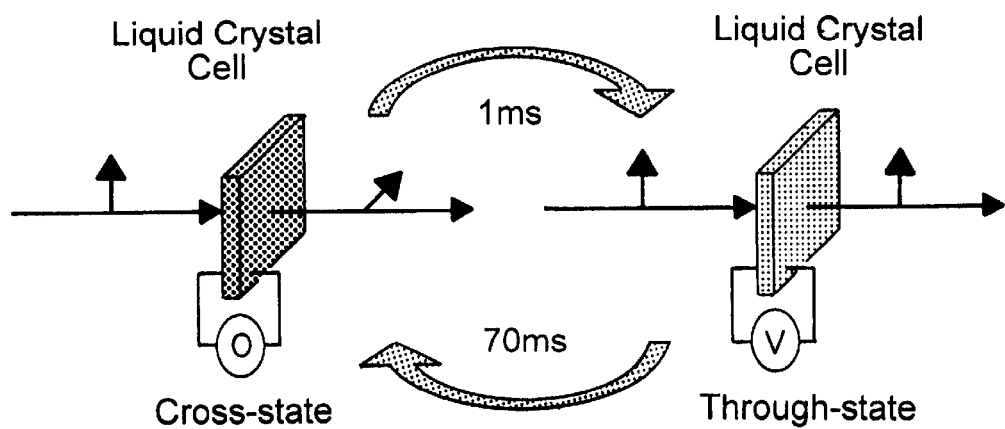
FIG. 1 is a schematic diagram illustrating the two switching states of a conventional liquid crystal cell.

If the LC cells are twist nematic cells, each LC cell has a first state (i.e., voltage off) in which the beam polarization is rotated by a predetermined degree (e.g., 90degrees), and a second state (i.e., voltage on) in which the polarization of the beam is substantially unchanged, as illustrated in FIG. 1. Each LC cell can be driven relatively quickly from the voltage-off state to the voltage-on state (i.e., in less than one millisecond). In contrast, a substantially longer period of time is required for an LC cell to relax from the voltage-on state to the voltage-off state.

Similarly, other liquid cells modes can be used to rotate the beam polarization, such as pi-cell and electrically controlled birefringence (ECB), which is sometimes also referred to as anti-parallel mode. For example, a pair of mixed-mode twist nematic (MTN) cells, one having a right-handed twist and the other having a left-handed twist angle of other than 90degrees, such as 30, 45, or 60degrees, can also be used to rotate the beam polarization. In each case, the LC cells can be changed between two states (typically voltage-on and voltage-off) to selectively produce two alternative polarization rotations having opposite, offsetting handedness.

In general, the polarization rotations in both states should offset one another due to their opposite directions. If the first LC cell 22 rotates the beam polarization by $\theta_1$ in the first state, the second LC cell 23 should rotate the beam polarization by approximately $-\theta_1$ in its first state so that the polarization rotations substantially offset one another and the net beam polarization remains essentially unchanged. Similarly, if the first LC cell 22 rotates the beam polarization by $\theta_2$ in the second state, the second cell LC cell 23 should rotate the beam polarization by approximately $-\theta_2$ in its second state so that the polarization rotations substantially offset one another.

Figure 3:
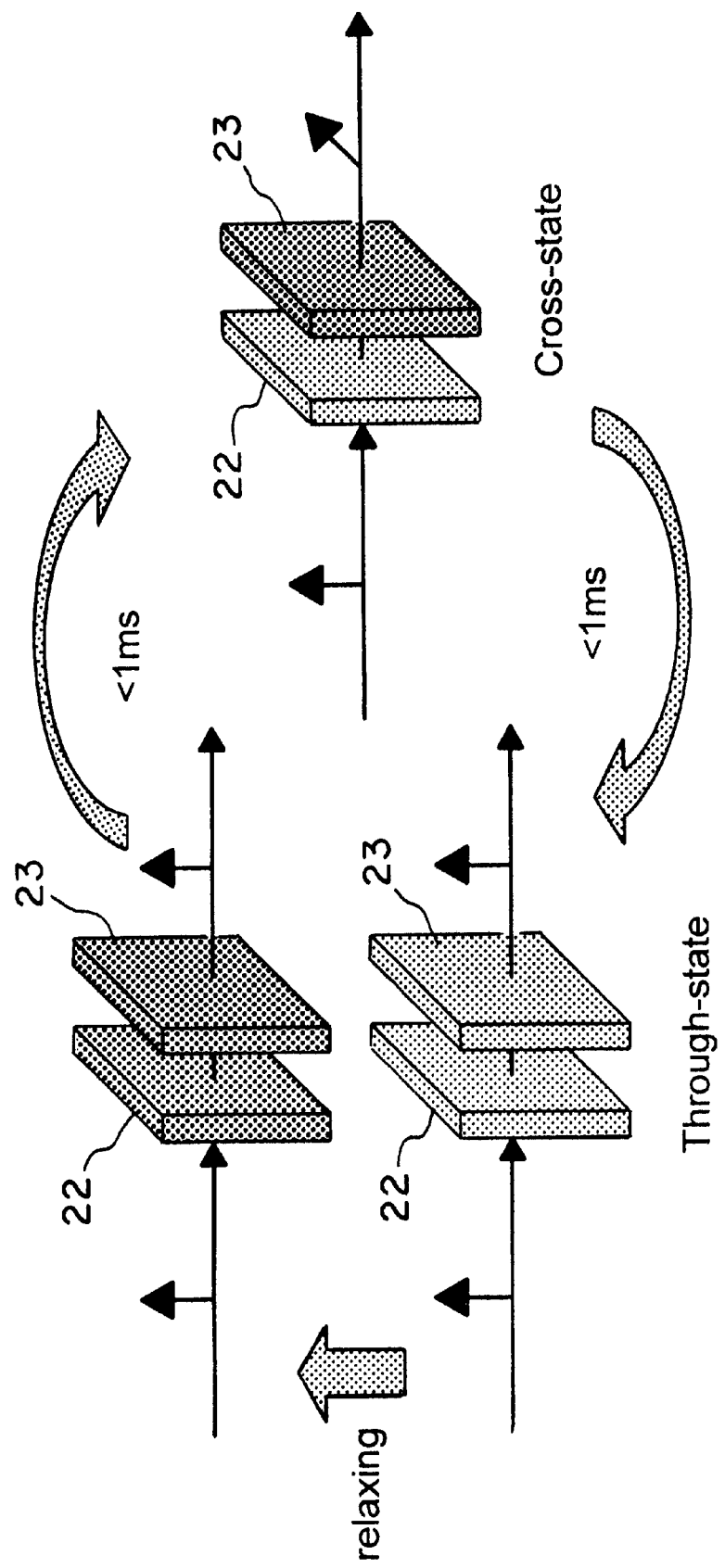
FIG. 3 is a schematic diagram illustrating the switching states of the liquid crystal cells 22 and 23 in the present invention.

A controller 25 generates the control signals that determine the states of the liquid crystal cells 22, 23. In the preferred embodiment of the present invention, the controller selectively cycles the liquid crystal cells 22, 23 through the following sequence of steps, as illustrated in FIG. 3:

(a) A "through" state in which both liquid crystal cells 22, 23 are in their first state (i.e., voltage off). The net result on beam polarization is essentially zero due to the offsetting polarization rotations provided by the LC cells 22, 23.

(b) A "cross" state in which one of the LC cells 22, 23 is changed to the second state and the other LC cell remains in the first state. In the cross state, the polarization of the beam is rotated by a predetermined degree (e.g., ±90degrees). As illustrated in FIG. 3, the switching time from the through state to the cross state is typically less than 1 ms at room temperature.

(c) A "through" state in which both liquid crystal cells 22, 23 are initially in the second state. Here again, the net result on beam polarization is essentially zero. The switching time from the cross state to the through state is also typically less than 1 ms at room temperature.

(d) While remaining in the "through" state, both liquid crystal cells are then allowed to relax to the first state to complete the cycle to (a). Both liquid crystal cells 22, 23 relax at the same rate and their opposing polarization rotations effectively offset each other, thus allowing the liquid crystal cells 22, 23 to remain in the "through" state throughout the entire relaxation process. At the end of the relaxation process, the system is ready for another round of fast switching actions.

In addition in step (d), the LC cells 22, 23 should be arranged such that the birefringence effect of both LC cells cancel each other throughout the relaxation process. If both LC cells 22, 23 are viewed as comprising a series of "layers" stacked along the optical axis, the liquid crystal molecules in corresponding layers of the LC cells should be perpendicular to each other to cancel the birefringent effect.

A polarization-dependent routing element 24 routes the beam exiting the second liquid crystal cell 23 along either of two alternative optical paths based on the beam's polarization. For example, the polarization-dependent routing element can be a birefringent element or a polarized beamsplitter.

In the embodiment shown in FIG. 2, the initial polarizer 21 is a polarizing filter. It should be expressly understood that other means for converting the input beam to a known polarization could be readily substituted. For example, FIGS. 4 and 5 are schematic diagrams of another embodiment of a 1×2 optical routing switch in which the polarizer 21 in FIG. 2 has been replaced with a birefringent element 42 and a half-wave plate 43.

Figure 4:
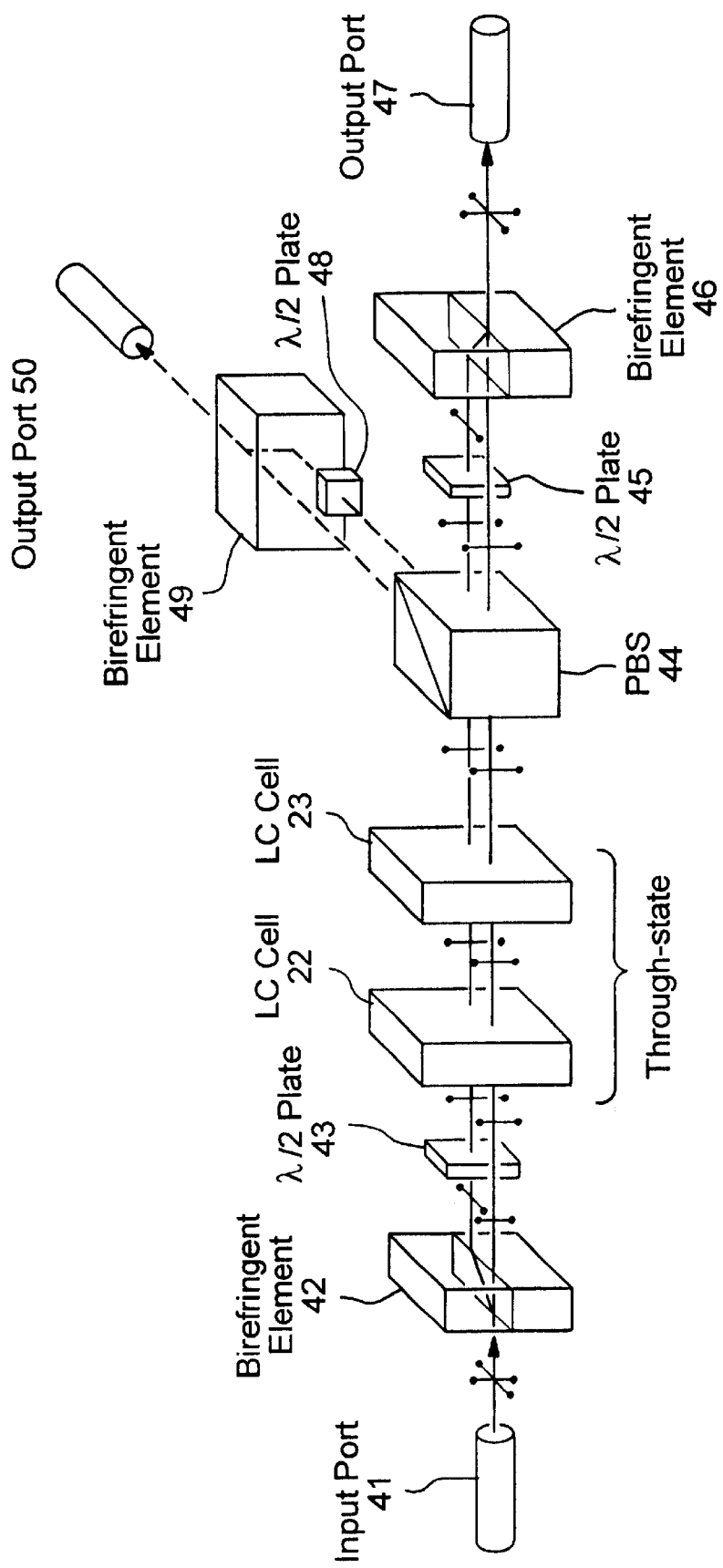
FIG. 4 is a schematic diagram of a 1×2 optical routing switch implementing the present invention.
Figure 5:
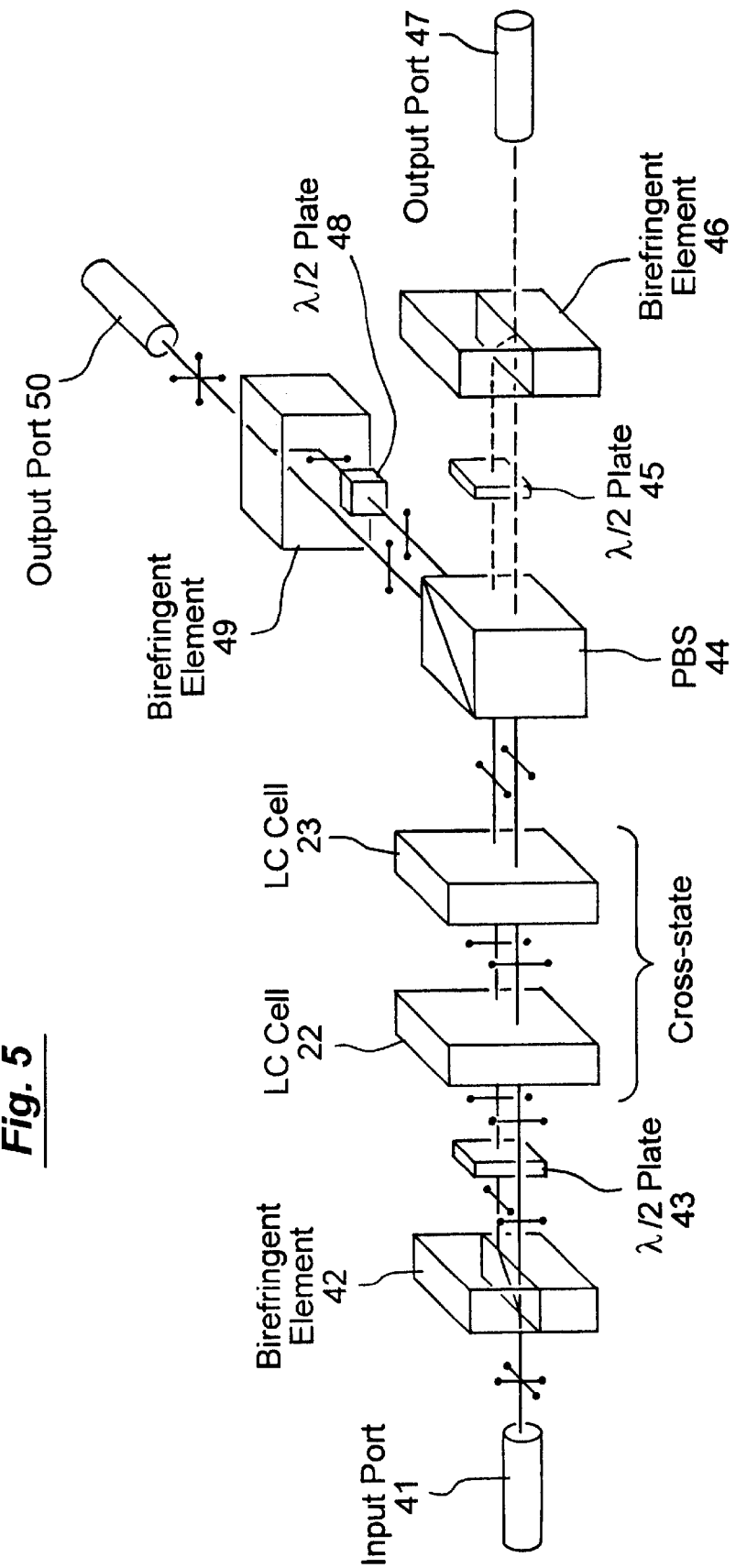
FIG. 5 is a schematic diagram corresponding to FIG. 4 showing the 1×2 optical routing switch in its second switching state.

Turning to FIGS. 4 and 5, the beam at the input port 41 has mixed polarization. The first birefringent element 42 separates the input beam into a pair of orthogonally polarized beams. A first polarization rotator 43 (e.g., a half-wave plate) rotates the polarization of at least one of the beam pair so that both beams have substantially the same polarization. Both beams then pass through the liquid crystal cells 22 and 23, which operate as previously described. The through state of the liquid crystal cells 22, 23 is shown in FIG. 4, while the cross state is shown in FIG. 5

A polarization dependent routing element 44 (e.g., a polarized beamsplitter) routes the beam pair exiting the second liquid crystal cell along one of two possible optical paths toward output port 47 or 50 based on the polarization of the beam pair. If the LC cells 22, 23 are in the through state, the beam pair is routed by the polarized beamsplitter 44 toward the first output port 47. A polarization rotator 45 (e.g., a half-wave plate) rotates the polarization of at least one of the beam pair so that the beam pair becomes orthogonally polarized. A final birefringent element 46 combines the orthogonally-polarized beam pair to produce the output beam at the first output port 47.

Alternatively, if the LC cells 22, 23 are in the cross state, the beam is routed toward the second output port 50. A polarization rotator 48 (e.g., a half-wave plate) rotates the polarization of at least one of the beam pair so that the beam pair becomes orthogonally polarized, and a birefringent element 49 combines the orthogonally-polarized beam pair at the second output port 50.

Figure 6:
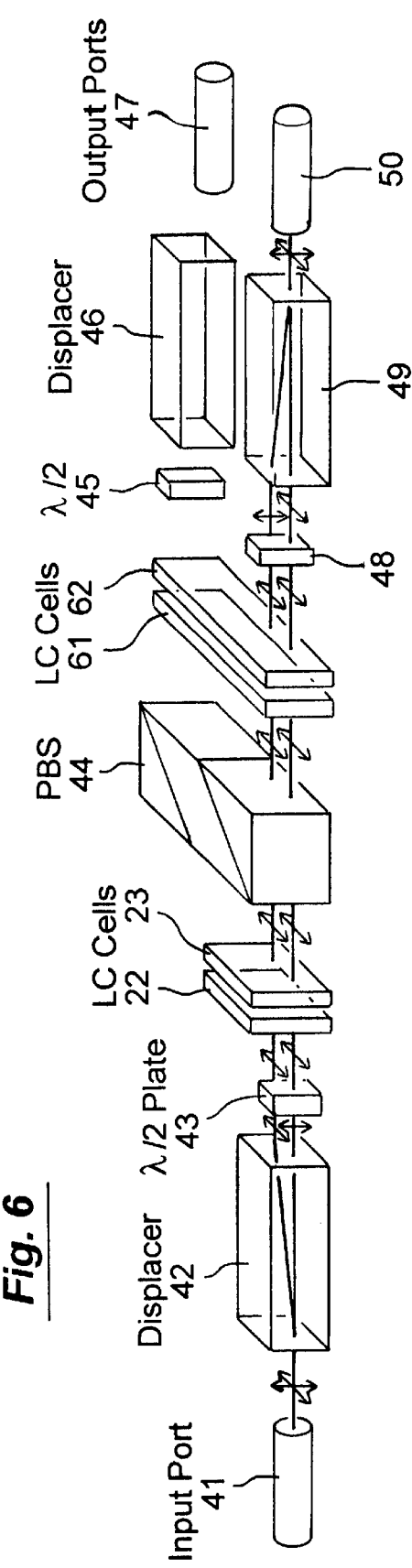
FIG. 6 is a schematic diagram of an alternative embodiment of a 1×2 optical routing switch implementing the present invention.
Figure 7:
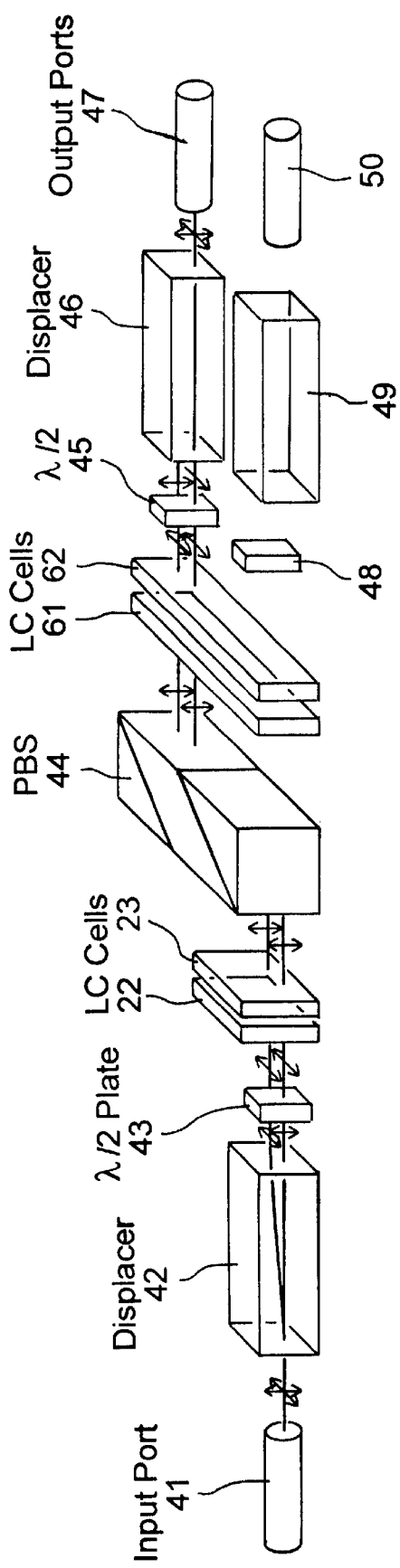
FIG. 7 is a schematic diagram of corresponding to FIG. 6 showing the 1×2 optical routing switch in its second switching state.

FIGS. 6 and 7 are schematic diagrams of an alternative embodiment of a 1×2 optical routing switch. This embodiment employs two pairs of liquid crystal cells 22, 23 and 61, 62 to reduce cross-talk. The initial portion of the switch operates in the same manner as in the previous embodiment. The first and second LC cells 22 and 23 continue to operate together to produce a through state as shown in FIG. 6, or a cross state as shown in FIG. 7. The PBS 44 has been modified by adding a 45° reflective surface so that the beam pair will exit along parallel sets of optical paths in either switching state.

The second set of LC cells 61, 62 function in the same manner as the first set of LC cells 22, 23 to provide a cross state or a through state as specified by the controller. In the embodiment illustrated in FIGS. 6 and 7, both sets of LC cells operate in tandem, so that either both sets are in the cross state or both sets are in the through state. Following the second set of LC cells 61 and 62, a half-wave plate 45, 48 returns the beam pair to orthogonal polarizations. A displacer (e.g., birefringent element) 46, 49 combines the beam pair to produce an output beam at the appropriate output port 47, 50, as determined by the state of the switch.

The advantage of this embodiment is that cross-talk is reduced. Cross-talk for a single-stage design, such as shown in FIGS. 2, 4, and 5 is generally inversely proportional to the polarization extinction ratio for the elements involved. In a two-stage design such as shown in FIGS. 6 and 7, cross-talk is generally inversely proportional to the square of the polarization extinction ratio. Further improvement may be possible by extending this concept to include additional stages. In the embodiment depicted in FIGS. 6 and 7, cross-talk is further reduced by the final displacer 46, 49 associated with each output port 47, 50. Any light reaching the final displacer 46, 49 for the inactive output port will tend to have a polarization that will result in it being routed out of alignment with the inactive output port by the displacer 46, 49. For example in FIG. 6, any vertically polarized light exiting the second LC cell 23 will be reflected within the polarized beamsplitter 44 to the upper optical path leading to output port 47. However, the final half-wave plate 45 along this optical path will produce a pair of orthogonally polarized beams from this light that are reversed in left-right order from that necessary for the displacer 46 to combine them in alignment with the inactive output port 47. The same applies for any horizontally polarized light exiting the second LC cell 23 in the switching state depicted in FIG. 7.

Figure 8:
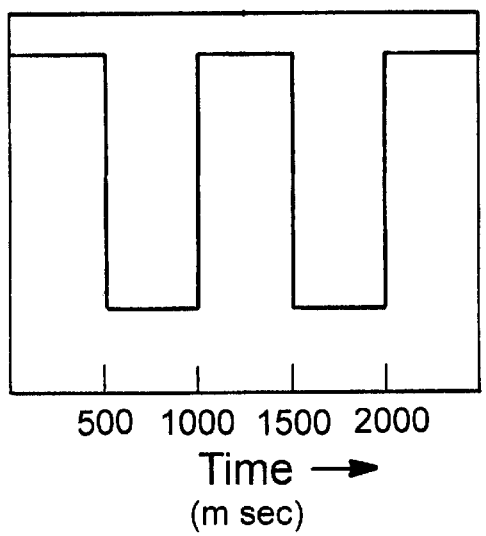
FIG. 8 is a graph showing the switching cycle between the two output ports in the 1×2 optical routing switch.
Figure 9:
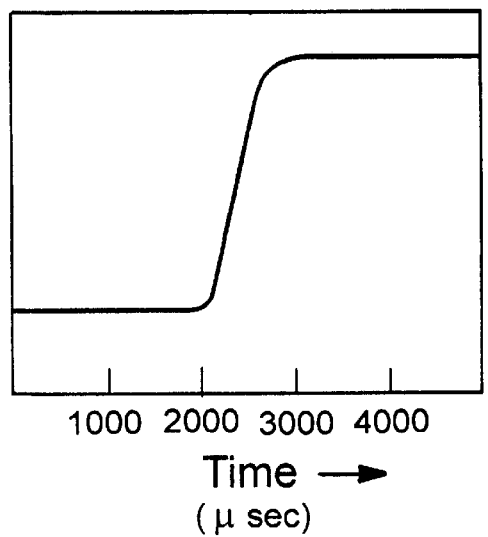
FIGS. 9 and 10 are graphs showing the zooming results for the switching-on and the switching-off processes, respectively, for a 1×2 optical routing switch implementing the present invention. The switching time in both cases is less than one millisecond.
Figure 10:
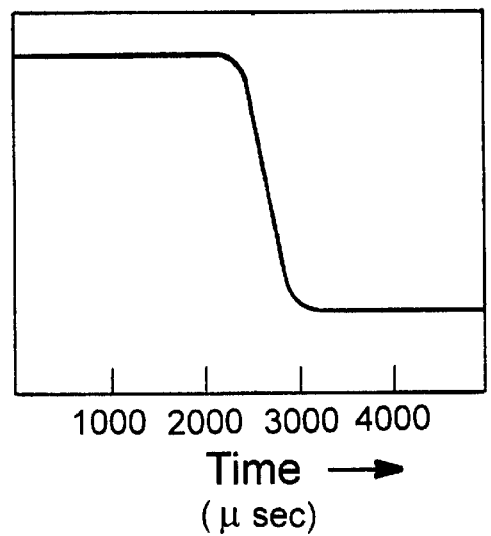

FIGS. 8, 9, and 10 show the measured switching time of a 1×2 optical routing switch incorporating the present invention at room temperature. FIG. 8 shows the switching cycles between the two output ports of the 1×2 switch. FIGS. 9 and 10 show the zooming results for switching on and switching off process. The switching time in both cases is less than a millisecond.

It should be expressly understood that the 1×2 optical routing switches discussed above can be readily extended to route optical signals between any number of input and output ports. For example, the present invention can be readily applied in a tree structure or a cascaded series of stages to create a 1×2$^N$ optical routing switch or a 1×N optical routing switch. The present invention can also be extended using other switching architectures, such as those disclosed in the applicants' U.S. Pat. Nos. 6,049,404, 5,946, 116, and 5,724,165, to create N×M optical routing switches.

The above disclosure sets forth a number of embodiments of the present invention. Other arrangements or embodiments, not precisely set forth, could be practiced under the teachings of the present invention and as set forth in the following claims.

We claim:

1. An optical routing switch comprising:
   a polarizer converting an input beam into a polarized beam;
   a first liquid crystal cell having a first state in which the polarization of said beam from said polarizer is rotated by a first angle, $\theta_1$, and a second state in which the polarization of said beam from said polarizer is rotated by a second angle, $\theta_2$, wherein the state of said first liquid crystal cell is determined by a control signal;
   a second liquid crystal cell having a first state in which the polarization of said beam from said first liquid crystal cell is rotated by $-\theta_1$, and a second state in which the polarization of said beam from said first liquid crystal cell is rotated by $-\theta_2$, wherein the state of said second liquid crystal cell is determined by a control signal; and
   a polarization-dependent routing element routing said beam from said second liquid crystal cell along either of two alternative optical paths based on the polarization of said beam from said second liquid crystal cell.

2. The optical routing switch of claim 1 wherein said polarization-dependent routing element comprises a birefringent element.

3. The optical routing switch of claim 1 wherein said polarization-dependent routing element comprises a polarized beamsplitter.

4. The optical routing switch of claim 1 wherein said polarizer comprises:
   a birefringent element separating the input beam into a pair of orthogonally polarized beams; and
   a polarization rotator rotating the polarization of at least one of said beam pair so that both beams have substantially the same polarization.

5. The optical routing switch of claim 1 wherein said polarizer comprises a polarizing filter.

6. The optical routing switch of claim 1 further comprising a controller generating control signals for said liquid crystal cells to selectively cycle said liquid crystal cells through the following sequence of steps:
   (a) a through state in which both of said liquid crystal cells are in said first state and the polarization of the beam remains substantially unchanged due to the offsetting polarization rotations provided by said liquid crystal cells;
   (b) a cross state in which one of said liquid crystal cells is in said second state and the other of said liquid crystal cells remains in said first state, and the polarization of the beam is rotated by a predetermined degree;
   (c) a through state in which both of said liquid crystal cells are in said second state and the polarization rotations provided by said liquid crystal cells substantially offset one another; and
   (d) returning both of said liquid crystal cells to said first state in step (a), while the polarization of the beam remains substantially unchanged due to the offsetting polarization rotations provided by said liquid crystal cells throughout this step.

7. The optical routing switch of claim 6 wherein the birefringence effect of said liquid crystal cells cancel each other during step (d).

8. The optical routing switch of claim 1 wherein $\theta_1$ is substantially equal to 90 degrees.

9. The optical routing switch of claim 1 wherein $\theta_2$ is substantially equal to 0 degrees.

10. The optical routing switch of claim 1 wherein said liquid crystal cells comprise twist nematic liquid crystal cells.

11. The optical routing switch of claim 1 wherein said liquid crystal cells comprise mixed-mode twist nematic liquid crystal cells.

12. The optical routing switch of claim 1 wherein said liquid crystal cells comprise electrically controlled birefringence liquid crystal cells.

13. The optical routing switch of claim 1 wherein said liquid crystal cells comprise pi-cell liquid crystal cells.

14. An optical routing switch comprising:
   a polarizer converting an input beam into a polarized beam;
   a first liquid crystal cell having a first state in which the polarization of said beam from said polarizer is rotated by a first angle, $\theta_1$, and a second state in which the polarization of said beam from said polarizer is rotated by a second angle, $\theta_2$;
   a second liquid crystal cell having a first state in which the polarization of said beam from said first liquid crystal cell is rotated by $-\theta_1$, and a second state in which the polarization of said beam from said first liquid crystal cell is rotated by $-\theta_2$;
   a controller selectively cycling said first and second liquid crystal cells through the following sequence of steps:
      (a) a through state in which both of said liquid crystal cells are in said first state and the polarization of the beam remains substantially unchanged due to the offsetting polarization rotations provided by said liquid crystal cells;
      (b) a cross state in which one of said liquid crystal cells is in said second state and the other of said liquid crystal cells remains in said first state, and the polarization of the beam is rotated by a predetermined degree;
      (c) a through state in which both of said liquid crystal cells are in said second state and the polarization rotations provided by said liquid crystal cells substantially offset one another; and
      (d) returning both of said liquid crystal cells to said first state in step (a), while the polarization of the beam remains substantially unchanged due to the offsetting polarization rotations provided by said liquid crystal cells throughout this step; and
   a polarization-dependent routing element routing said beam from said second liquid crystal cell along either of two alternative optical paths based on the polarization of said beam from said second liquid crystal cell.

15. The optical routing switch of claim 14 wherein said polarization-dependent routing element comprises a birefringent element.

16. The optical routing switch of claim 14 wherein said polarization-dependent routing element comprises a polarized beamsplitter.

17. The optical routing switch of claim 14 wherein said polarizer comprises:
   a birefringent element separating the input beam into a pair of orthogonally polarized beams; and
   a polarization rotator rotating the polarization of at least one of said beam pair so that both beams have substantially the same polarization.

18. The optical routing switch of claim 14 wherein said polarizer comprises a polarizing filter.

19. The optical routing switch of claim 14 wherein the birefringence effect of said liquid crystal cells cancel each other during step (d).

20. A method for switchably routing an input optical beam along either of two alternative output optical paths, said method comprising:
   polarizing the input optical beam;
   directing the polarized beam through a first liquid crystal cell having a first state in which the polarization of the beam is rotated by a first angle, $\theta_1$, and a second state in which the polarization of the beam is rotated by a second angle, $\theta_2$;
   directing the beam exiting the first liquid crystal cell through a second liquid crystal cell having a first state in which the polarization of the beam is rotated by $-\theta_1$ and a second state in which the polarization of the beam is rotated by $-\theta_2$;
   selectively controlling the first and second liquid crystal cells through the following sequence of steps:
      (a) a through state in which both of the liquid crystal cells are in the first state and the polarization of the beam remains substantially unchanged due to the offsetting polarization rotations provided by the liquid crystal cells;

(b) a cross state in which one of the liquid crystal cells is in the second state and the other liquid crystal cell remains in the first state, and the polarization of the beam is rotated by a predetermined degree;

(c) a through state in which both of the liquid crystal cells are in the second state and the polarization rotations provided by the liquid crystal cells substantially offset one another; and (d) returning both of the liquid crystal cells to the first state in step (a), while the polarization of the beam remains substantially unchanged due to the offsetting polarization rotations provided by the said liquid crystal cells throughout this step; and routing the beam exiting the second liquid crystal cell along either of two alternative optical paths based on the polarization of the beam.

21. The method of claim 20 wherein the step of routing the beam based on its polarization is performed by a polarized beamsplitter.

22. The method of claim 20 wherein the step of routing the beam based on its polarization is performed by a birefringent element.

23. An optical routing switch comprising:

a first birefringent element spatially separating an input optical beam into a pair of orthogonally polarized beams;

a polarization rotator rotating the polarization of at least one of said beam pair so that both beams have substantially the same polarization;

a first liquid crystal cell having a first state in which the polarization of said beam pair is rotated by a first angle, $\theta_1$, and a second state in which the polarization of said beam pair is rotated by a second angle, $\theta_2$;

a second liquid crystal cell having a first state in which the polarization of said beam pair from said first liquid crystal cell is rotated by $-\theta_1$, and a second state in which the polarization of said beam pair from said first liquid crystal cell is rotated by $-\theta_2$;

a controller selectively cycling said first and second liquid crystal cells through the following sequence of steps:

(a) a through state in which both of said liquid crystal cells are in said first state and the polarization of said beam pair remains substantially unchanged due to the offsetting polarization rotations provided by said liquid crystal cells;

(b) a cross state in which one of said liquid crystal cells is in said second state and the other of said liquid crystal cells remains in said first state, and the polarization of said beam pair is rotated by a predetermined degree; and (c) a through state in which both of said liquid crystal cells are in said second state and the polarization rotations provided by said liquid crystal cells substantially offset one another; and (d) returning both of said liquid crystal cells to said first state in step (a), while the polarization of said beam pair remains substantially unchanged due to the offsetting polarization rotations provided by said liquid crystal cells throughout this step;

a polarization-dependent routing element routing said beam pair from said second liquid crystal cell along either of a first or a second optical path based on the polarization of said beam pair from said second liquid crystal cell;

a second polarization rotator rotating the polarization of at least one of said beam pair along said first optical path so that said beam pair becomes orthogonally polarized;

a second birefringent element combining said orthogonally-polarized beam pair from said second polarization rotator to produce an output beam;

a third polarization rotator rotating the polarization of at least one of said beam pair along said second optical path so that said beam pair becomes orthogonally polarized; and a third birefringent element combining said orthogonally-polarized beam pair from said third polarization rotator to produce an output beam.

24. The optical routing switch of claim 23 wherein said polarization-dependent routing element comprises a birefringent element.

25. The optical routing switch of claim 23 wherein said polarization-dependent routing element comprises a polarized beamsplitter.

26. The optical routing switch of claim 23 wherein the birefringence effect of said liquid crystal cells cancel each other during step (d).

* * * * *